2,711,801

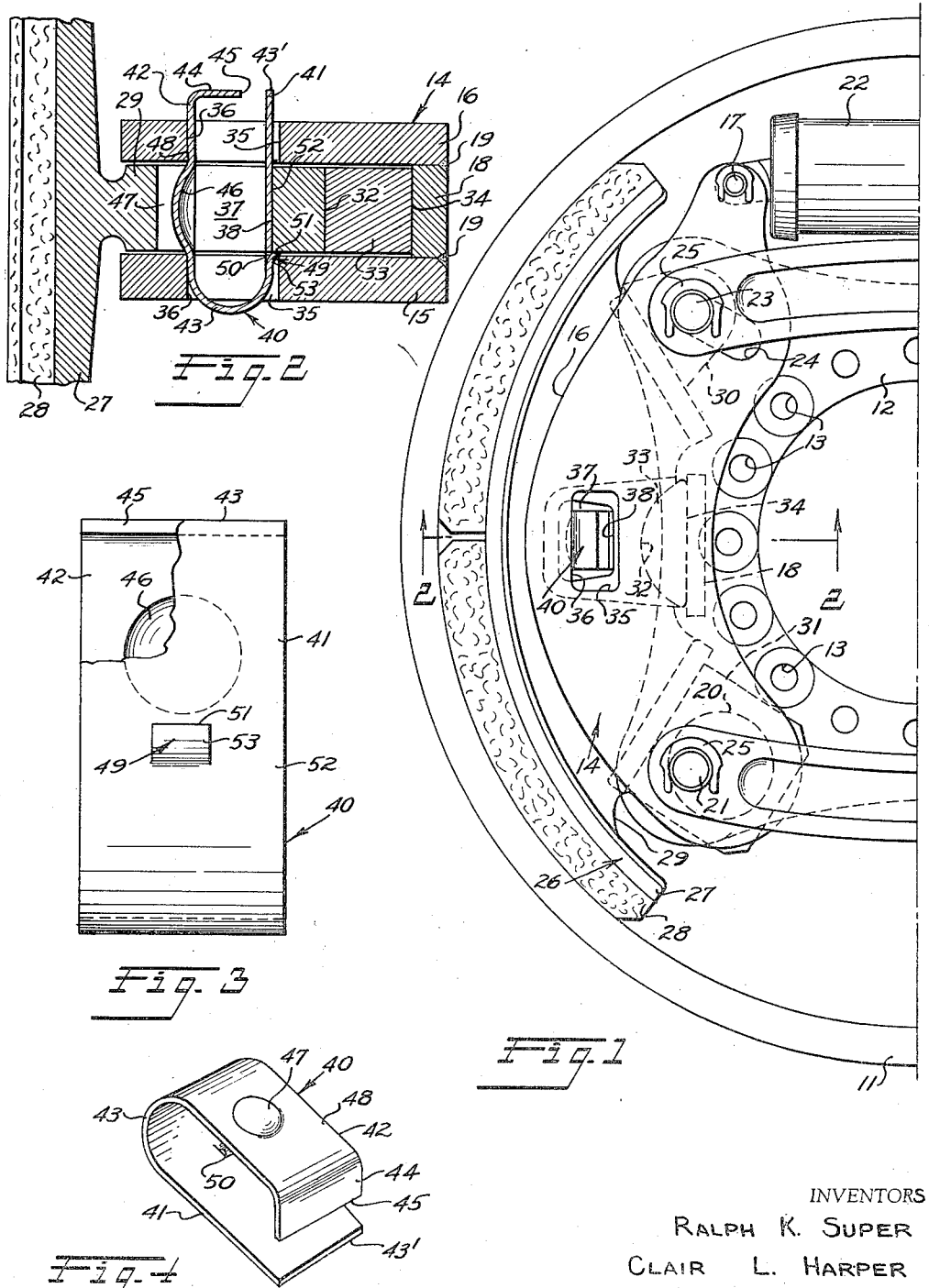

United States Patent Office

Patented June 28, 1955

2,711,801

DETACHABLE BRAKE SHOE

Ralph K. Super and Clair L. Harper, Ashtabula, Ohio, assignors, by mesne assignments, to Rockwell Spring and Axle Company, Coraopolis, Pa., a corporation of Pennsylvania Application August 7, 1951, Serial No. 240,635

2 Claims. (Cl. 188—242)

This invention relates generally to friction brake mechanisms and more specifically to the type of friction brake mechanisms wherein a brake shoe is mounted for sliding and rocking movement upon a pivoted actuating lever assembly.

A brake of the character to which the invention is particularly applicable is disclosed in United States Letters Patent No. 2,432,983 issued December 23, 1947 to Buckendale and Super, wherein each brake shoe is slidably and rockably mounted on a pivoted lever, and spring biased retainer means is provided between the shoe web and the lever. While the disclosed brake mechanism is generally satisfactory efforts continue to constantly improve it, and the present invention is concerned with improved retainer means wherein the separate coil spring and spring seat clip of the patent are replaced by an integral resilient retainer clip that is not only new by itself but also makes for an improved shoe and lever assembly.

It is therefore the major object of this invention to provide a novel brake shoe and actuating lever assembly wherein a novel spring retainer clip is provided between the shoe and lever.

Another object of this invention is to provide a novel combination resilient spring and retainer clip adapted to hold a brake shoe in operable assembly with a brake actuating lever, the clip being of such construction as to facilitate assembly or disassembly of the brake shoe and the actuating lever.

This and other objects of the invention will become apparent as the specification continues with reference to the appended claims and the annexed drawing wherein:

Figure 1 is a side elevation, partly in section, illustrating one-half (on one side of a center line) of a symmetrical friction brake mechanism having a brake shoe resiliently mounted for rocking and sliding movement upon a pivoted brake actuating lever and incorporating a spring clip retainer according to a preferred embodiment of this invention;

Figure 2 is a sectional view taken substantially along line 2—2 of Figure 1 illustrating the manner in which the clip is mounted between the brake shoe and the actuating lever;

Figure 3 is an enlarged top plan view of the clip of Figures 1 and 2; and

Figure 4 is a pictorial view of the clip of Figures 1–3. The specification now proceeds with continued reference to the drawing wherein like numerals designate like parts throughout the several figures.

A rotatable brake drum 11 surrounds a brake spider 12 which is non-rotatably secured in any conventional manner, as by rivets passing through a row of rivet holes 13, to an axle housing (not shown). A brake shoe actuating lever assembly 14 comprises a pair of similar plates 15 and 16 secured together in laterally spaced relation by a shouldered stud 17 and a saddle bar 18 butt welded between the plates as indicated at 19 in Figure 2. The lever assembly 14 is pivotally mounted at its lower end upon spaced concentric portions of a rotatably adjustable anchor pin 21 mounted in a leg of the brake spider. Anchor pin 21 is formed with an eccentric cylindrical portion 20 between plates 15 and 16 as illustrated in Figure 1. At the upper end of the lever assembly, stud 17 is operably pivotally connected to any conventional actuating means such as an hydraulic cylinder 22.

An upper anchor pin 23 is rigidly mounted on spider 12 in vertical alignment with lower anchor pin 21 and passes through an elongated opening 24 in lever assembly 14 which permits rocking of the lever assembly about lower pin 21. Fastening elements 25 are carried by pins 21 and 23.

A brake shoe 26 comprises an arcuate platform 27 adapted to carry a friction lining 28 secured thereto in a conventional manner. The inner periphery of platform 27 merges into an integral radial web 29 that extends into the space between plates 15 and 16 of the actuating lever assembly. Web 29 is formed with an arcuate surface 32 in bearing contact with a free rocker or fulcrum member 33 that has an opposite flat surface 34 in sliding contact with saddle bar 18. Shoe web 29 is formed at opposite ends with inclined faces in sliding engagement with abutments 30 and 31 freely pivoted on upper anchor pin 23 and eccentric 20, respectively.

The above described construction is disclosed in said patent to which reference is made for more detail if needed.

Radially outwardly from saddle bar 18, the actuating lever assembly is provided with an opening comprising aligned generally rectangular apertures 35 in plates 15 and 16. Apertures 35 are formed on the outer side nearest platform 27 with laterally aligned parallel faces 36 which lie in a plane parallel to surface 34.

Web 29 of the brake shoe is formed with an aperture 37 located to overlap faces 36 of the lever assembly. The inner edge of brake shoe aperture 37 is a flat face 38 lying in a plane perpendicular to a radius bisecting the arc of surface 32. Normally, face 38 is substantially parallel to faces 36.

In said patent disclosure, a short coil spring is compressed and inserted into the corresponding aperture of the brake shoe, its inner end seating on the face 38 and its outer end seating on a separate retainer member that bridges plates 15 and 16 and rests on faces 36 in the assembly.

In this invention we have substituted for the separate spring and retainer of the above-mentioned patent a single multi-function element comprising a combination spring clip member 40. In the preferred embodiment of the invention, spring clip 40 is formed from flat spring steel into a substantially U-shaped element having spaced flat generally parallel legs 41 and 42 joined by an arcuate bridge 43. Legs 41 and 42 are preferably of equal length, leg 41 terminating in a longitudinally facing edge 43' and leg 42 terminating in an inwardly bent lip 44 that is preferably disposed at right angles to arm 42 and terminates in a laterally facing edge 45 short of contact with leg 41 so as not to restrict the lateral compression of the clip during insertion or withdrawal from the assembly.

About midway of its length, leg 42 is centrally formed with an internal circular center depression 46 that provides an external rounded cam face 47 projecting from its otherwise flat side face 48. Alternatively face 47 might be formed by welding or similarly securing a rounded projection on side face 48. The diameter of cam face 47 is only slightly less than the distance between the inner surfaces of plates 15 and 16 at apertures 35 for a purpose to appear.

Near its junction with bridge 43, leg 41 is centrally formed with an integral tab 49 which is preferably struck out of leg 41, leaving an aperture 50 therein, and provides a stop face 51 raised above the otherwise flat surface 52 of the leg and facing in the direction of edge 43'. Alternatively tab 49 might comprise a rigid projection welded or similarly secured on surface 52. Behind the stop face 51, tab 49 has an inclined surface 53 sloping back to the leg.

In the assembly illustrated in Figure 2, when spring clip 40 is mounted in position, flat surface 48 of leg 42 lies on faces 36 of the lever plates and cam face 47 lies just inside the adjacent inner sharp corners of faces 36 which thereby oppose lateral movement of clip 40 relative to either the shoe web or the lever. In addition to thus opposing displacement of the retainer, cam face 47 acts to center clip 40 in the assembly. Stop face 51 acts further to very positively limit lateral displacement of the clip 40 in one direction since it engages the adjacent side of shoe web 29, the outer flat surface 52 of leg 41 lying on flat face 38 of the shoe web.

Spring clip 40 reacts radially between the actuating lever assembly and the brake shoe to thereby force the brake shoe firmly against rocker member 33 and thereby force the rocker member firmly against saddle bar 22 of the brake lever assembly. Spring clip 40 is thus the sole means holding the brake shoe and rocker member in assembled relationship with the actuating lever. Spring clip 40 exerts a force in excess of 225 pounds in the assembly in a practical embodiment of the invention and cannot be removed from the assembled position without being compressed, so that it may not be accidentally dislodged.

In assembling the brake shoe with the actuating lever assembly, brake shoe 26 and rocker member 33 are placed in their correct relative positions with respect to lever assembly 14. Then the shoe and lever are mounted in position with rocker 33 in place and with apertures 35 and 37 substantially aligned. Then the clip 40 is compressed by squeezing together the free ends of legs 41 and 42, as by pliers, and the clip is pushed, bridge 43 foremost, through aperture 36 in leg 16. As the clip 40 passes through this aperture toward the position of Figure 2, the inclined surfaces of cam face 47 and at 53 of tab 49 cam over the edges of the aperture, thus further tending to compress the clip until cam face 47 clears the aperture and drops into its centered position of Figure 2. By this time tab 49 has just passed shoe face 38 and the clip, released by the pliers, is free to expand and center and seat itself in the assembly. Cam face 47 now engages and extends between the adjacent inner corners of face 36 on both plates 15 and 16 and stop face 51 abuts the adjacent side of brake shoe web 29 to positively centrally locate and hold the spring clip in position.

In order to separate brake shoe 26 from the lever 14, as for relining, it will be noted that when the clip 40 is in its operative position of Figure 2, the bridge portion 43 projects through aperture 35 of lever plate 15, and as shown in Figure 1 the width of clip 40 is less than the long dimension of aperture 35 of plate 15, so that a screw-driver, rod, or similar tool may be readily inserted through this end of the clip and used as a lever to pry the spring clip from the assembly by pulling it through aperture 35 of plate 15. This causes cam face 47 of the spring clip 40 to ride up over the adjacent corner of aperture 35 of plate 15 thereby laterally compressing the spring clip and permitting it to be easily removed from the assembly. Lip 44 on leg 42 is provided to prevent over-compressing of clip 40 and over-stressing of rounded bridge portion 43, to avoid a subsequent loss of load effectiveness of the spring when the parts are reassembled.

A satisfactory spring clip member 40 which has proved successful in practice in a commercial brake structure is made of flat spring steel of about $\frac{1}{16}$ inch thickness and about $\frac{7}{8}$ inch wide by $1\frac{23}{32}$ inches long in the working position. The cam face 47 is about $\frac{17}{32}$ inch in diameter and projects about $\frac{1}{16}$ inch above surface 48. The tab 49 is about $\frac{1}{4}$ inch wide and projects about $\frac{1}{16}$ inch above surface 52. Cam face 47 may be an arc of about $\frac{9}{16}$ inch radius, or similarly sloped from surface 48. The solid compressed height of the spring clip may be about $\frac{3}{4}$ inch.

This invention may be embodied in other specific forms without departing from the spirit or essential characteristics thereof. The present embodiment is therefore considered to be in all respects as illustrative and not restrictive, the scope of the invention being indicated by the appended claims rather than by the foregoing description and all changes which come within the meaning and range of equivalency of the claims are intended therefore to be embraced therein.

What is claimed and desired to be secured by United States Letters Patent is:

1. In a brake assembly, an actuating lever member, a brake shoe member rockably and slidably mounted on said lever member, one of said members having a web projecting between spaced walls of the other of said members, said web and said walls having corresponding apertures having inner and outer edges, a generally U-shaped spring retainer clip projecting through said apertures and laterally compressed between said members, a single projection on one side of said retainer clip intermediate the ends thereof substantially engaging the inner edges of the apertures in said walls in the assembly for centering the clip and positively holding it against accidental displacement from its operative centered position, and a raised stop on the other side of said clip adapted to contact a side of said web to limit lateral displacement of said clip in the assembly.

2. For use in a brake assembly having an actuating lever member and a brake shoe member rockably and slidably mounted on said lever member with one of said members having a web projecting between spaced walls of the other of said members and said web and said walls having apertures, an integral brake element retainer clip adapted to be inserted into said apertures for structurally cooperating with and maintaining the lever member and shoe member in assembled relation comprising a length of flat spring metal formed into substantially U-shape with coextensive side legs joined at one end by an arcuate bridge, a raised external cam face on only one of said legs substantially midway between the bridge and the other end of said one leg and a raised external stop on only the other of said legs having a stop edge facing said other end of said other leg and spaced from the bridge a distance substantially equal to the distance between the bridge and the edge of said cam face closest to said bridge, the entire external surface of said clip along said legs and bridge being otherwise continuous, and the maximum chordal distance of said arcuate bridge being less than the distance from the raised cam face to the external surface of said other leg.

References Cited in the file of this patent
UNITED STATES PATENTS

| | | |
|---|---|---|
| 1,248,723 | Roth | Dec. 4, 1917 |
| 1,465,975 | Emery | Aug. 28, 1923 |
| 2,013,981 | Busch | Sept. 10, 1935 |
| 2,058,733 | Smith | Oct. 27, 1936 |
| 2,068,633 | Upham | Jan. 19, 1937 |
| 2,112,247 | McLoughlin | Mar. 29, 1938 |
| 2,140,064 | Tinnerman | Dec. 13, 1938 |
| 2,328,757 | Tinnerman | Sept. 17, 1943 |
| 2,432,983 | Buckendale et al. | Dec. 23, 1947 |
| 2,511,129 | Schaal | June 13, 1950 |